(12) United States Patent
Bergoend et al.

(10) Patent No.: US 7,254,252 B2
(45) Date of Patent: Aug. 7, 2007

(54) METHOD AND DEVICE FOR PRINTING AND PREPARING MAIL FROM A DATA STREAM

(75) Inventors: Philippe Bergoend, St. Brice s/Forêt (FR); Gilles Nauche, Munich (DE)

(73) Assignee: SECAP (Groupe Pitney Bowes) S.A.S., Saint Denis LaPlaine (FR)

( * ) Notice: Subject to any disclaimer, the term of this patent is extended or adjusted under 35 U.S.C. 154(b) by 714 days.

(21) Appl. No.: 10/391,329

(22) Filed: Mar. 18, 2003

(65) Prior Publication Data
US 2004/0030443 A1 Feb. 12, 2004

(30) Foreign Application Priority Data
Mar. 20, 2002 (FR) .................................. 02 03467

(51) Int. Cl.
*G06K 9/00* (2006.01)
(52) U.S. Cl. .................................................. 382/101
(58) Field of Classification Search ................ 382/101; 358/1.12, 1.18; 53/460
See application file for complete search history.

(56) References Cited

U.S. PATENT DOCUMENTS 6,327,042 B1 * 12/2001 Krasuski et al. ........... 358/1.12
6,384,931 B1 * 5/2002 Brown et al. ............... 358/1.18
6,393,135 B1 * 5/2002 Girardi et al. .............. 382/101
6,988,349 B2 * 1/2006 Woodman .................... 53/474

FOREIGN PATENT DOCUMENTS

| EP | 0 298 728 A1 | 1/1989 |
| FR | 2 602 181 A1 | 2/1988 |
| WO | 98 24563 A1 | 6/1998 |

\* cited by examiner

*Primary Examiner*—Phuoc Tran
(74) *Attorney, Agent, or Firm*—George M. Macdonald; Angelo N. Chaclas; Steven J. Shapiro

(57) ABSTRACT

The invention relates to a method of printing and preparing mail from a data stream distributed in several pages which are intended to be printed on sheets and enveloped, the number of sheets contained in an envelope being able to vary from one envelope to another, characterized in that the method comprises the following steps:
  selecting from amongst the data stream at least one identification criterion for the various pages intended to be contained in each envelope,
  analyzing the data stream according to said at least one identification criterion in order to identify, for each envelope, the pages concerned,
  printing the pages on sheets,
  enveloping the sheets on which the pages are printed according to the result of the identification, for each envelope, of the pages concerned.

22 Claims, 8 Drawing Sheets

ORLEANS
  1234567890
  1234567891    Garage de la Station
552081317 20768 ,    80 RUE DE PARIS
 invoice: 01251627

75605 PARIS CEDEX 12

17/09/01

SUPPLIES EURO    type: xx registration xxxxxx
 13/09/01

PROMEURO FROM BALANCE TARIFF EURO 586.00 1 595.00  19.60
            Euro   90.71

FFr 595.00 116.62 711.62
Check dated: 25/09/01   Euro 90.71 17.78 108.49

VIA BANK xxxxx xx xx xx xxxxx
Bank code: xxxxx Head office code: xxxxx
xxxxxxxxxx C Key: xx   552081317 20768 01251627
             FFr 711.62
            Euro 108.49

Fig. 4

| Envelope | Pages | Ref | Criterion | Address |
|---|---|---|---|---|
| 1 | 2 | 1-2 | Garage de la Station ... | Garage de la Station 80 RUE DE PARIS 75605 PARIS CEDEX 12 |
| 2 | 1 | 3-3 | Café de la Gare 5, R... | Café de la Gare 5, RUE DU DEPART 95880 ENGHIEN-LES-BAINS |
| 3 | 1 | 4-4 | A.G.6.R 13, RUE DU ... | A.G.6.R 13, RUE DU 3 NOVEMBRE B.P. 359 44002 NANTES CE... |
| 4 | 3 | 5-7 | Boucherie Martin 121 ... | Boucherie Martin 121 GRANDE AVENUE 59000 LILLE |
| 5 | 1 | 8-8 | Services Techniques ... | Services Techniques 12, PLACE DE LA MAIRIE B.P. 53 91000 E... |

● All envelopes ○ Defective envelopes

Fig. 8

METHOD AND DEVICE FOR PRINTING AND PREPARING MAIL FROM A DATA STREAM

BACKGOUND

The present invention concerns a device for printing and preparing mail from a data stream distributed in several pages which are intended to be printed and enveloped.

Mail processing systems are known which, from a data stream divided into several pages, print these pages on sheets and envelope them, that is to say insert them in envelopes.

Such a data stream is, for example, in the form of a computer file containing data relating to several customers.

Two cases of functioning may arise depending on whether the number of sheets intended for a customer and inserted in an envelope varies from one envelope to another or remains constant.

In the first case the processing of "heterogeneous" envelopes is spoken of, whilst in the second case the processing of "homogeneous" envelopes is spoken of.

Some known mail processing systems make provision for processing heterogeneous envelopes by proceeding as follows:

the user of the system first adds information to the data stream making up the computer file in order to identify the pages which are allocated to a given customer and which must be contained in the same envelope.

However, this information will not be printed on the sheets which will be inserted in the envelopes.

This type of system has the drawback for the user of having to add information in the data stream, which complicates the task of the user.

Another mail processing system is known in which information is also added to the pages intended to be printed on sheets and subsequently inserted in the envelopes in order to identify the pages which are addressed to the same customer and which must therefore be contained in the same envelope.

To simplify, it will be considered that a sheet is printed on only one side, the number of sheets then being equal to the number of pages.

This additional information is printed on the sheets, for example in the form of a bar code peculiar to each customer and, for this purpose, one or more bar code readers are provided downstream of the printer to read this additional information printed on the sheets and to inform a unit managing the mail processing system of the presence of these pages.

By receiving this information identifying the printed pages, the management unit knows, for example, that all the sheets having the same bar code must be inserted in the same envelope, since they are addressed to the same customer.

The management unit is then in a position to transmit commands to an enveloping unit so that the sheets intended for the same customer are procured and processed by the enveloping unit for the purpose of insertion in the envelope concerned.

This method has the drawback of having not only to introduce additional information on the initial data stream pages but also having to print this information on the sheets and to equip the machine with optical readers, more generally sensors, in order to be able to read the information printed on said sheets and to restore them to the management unit, which will then control the enveloping operations.

Such a method of processing heterogeneous envelopes is therefore complicated to implement and expensive since it uses additional equipment (sensors etc).

In addition it is still necessary, according to this method, to introduce, into the data stream intended for customers, additional information compared with the initial data stream.

SUMMARY OF THE INVENTION

The present invention aims to remedy at least one of the aforementioned drawbacks by proposing a method of printing and preparing mail from a data stream distributed in several pages which are intended to be printed on sheets and enveloped, the number of sheets contained in an envelope being able to vary from one envelope to another, characterized in that the method comprises the following steps:

selecting from amongst the data stream at least one identification criterion for the various pages intended to be contained in each envelope, analyzing the data stream according to said at least one identification criterion in order to identify, for each envelope, the pages concerned, printing the pages on sheets, enveloping the sheets on which the pages are printed according to the result of the identification, for each envelope, of the pages concerned.

Correspondingly, another object of the invention is a device for printing and preparing mail from a data stream distributed in several pages which are intended to be printed on sheets and enveloped, the number of sheets contained in an envelope being able to vary from one envelope to another, characterized in that the device comprises:

a unit for selecting from amongst the data stream at least one identification criterion for the various pages intended to be contained in each envelope, a unit for analyzing the data stream according to said at least one identification criterion in order to identify, for each envelope, the pages concerned, a unit for printing the pages on sheets, a unit for enveloping the sheets on which the pages are printed according to the result of the identification, for each envelope, of the pages concerned.

Thus, by having recourse solely to the initial data stream and seeking amongst these data one or more identification criteria for the various pages intended to be contained in each envelope, the invention makes it possible to easily manage the processing of heterogeneous envelopes without having to insert additional data amongst the initial data stream.

It should be noted that the invention is not only adapted for processing heterogeneous envelopes but also homogeneous envelopes, that is to say envelopes containing the same number of sheets.

It should be noted that the identification criterion or criteria selected are valid for all the pages in the data stream, which simplifies the analysis of this data stream.

According to one characteristic, the selection of at least one identification criterion is performed by selecting, on a given page, at least one geometric position to which the data in the data stream are allocated and which are referred to as identification data.

According to another characteristic, the method comprises a prior step of displaying one or more pages containing at least some of the data in the data stream.

Thus it is possible to display, for example on a computer screen, one or more pages containing data in the data stream and which will subsequently be printed on sheets before being enveloped.

This enables the user to locate on the page or pages displayed the geometric position of the data in the stream which will serve as an identification criterion for identifying all the pages intended for the same envelope.

More particularly, the selection of the identification criterion is made by means of a user interface element such as, for example, a mouse, keyboard etc.

According to one characteristic, the step of analyzing the data stream comprises more particularly the following substeps:

seeking in a page currently being analyzed the geometric position allocated to the identification data, reading the identification data present at this geometric position, comparing the identification data present at this geometric position with the identification data for the page previously analyzed, and according to the result of this comparison, deciding in order to determine whether the page currently being analyzed is intended for the same envelope as the page previously analyzed.

Thus the data stream is particularly simple to analyze since it suffices to seek, amongst the data stream, on each page, the geometric position of the identification data and to compare these with those on the previous page.

According to one characteristic, after the previous search step, the method comprises a step of verifying the presence of data at the geometric position found for the page currently being analyzed.

Thus, in the absence of data at the geometric position concerned, a defectiveness signal is generated in order to inform the user.

According to another characteristic, the method comprises a step of verifying the compatibility of the identification criterion selected with at least one characteristic of an enveloping unit which performs the enveloping of the sheets on which the pages are printed.

This makes it possible in fact, during the processing of the data stream, to verify that the selected criterion will not give rise to malfunctioning when the sheets are enveloped.

For example, one of the characteristics of the enveloping unit is the processing capacity of the enveloping unit.

According to this example, it would in fact not be necessary for the selected criterion to result in the number of sheets to be inserted in an envelope to exceed its processing capacity since then a malfunctioning normally termed "paper jam" might occur.

According to one characteristic, the identification criterion selected is compatible with at least one characteristic of an enveloping unit which performs the enveloping of the sheets on which the pages are printed.

This is because it is possible to propose one or more identification criteria to be selected, for example by the user, which are straightaway compatible with the aforementioned characteristic or characteristics. Thus, in this eventuality, it is not necessary to subsequently proceed with a step of verifying the compatibility of the selected criterion with the aforementioned characteristic or characteristics.

According to one characteristic, for each envelope, the method comprises a step of communicating information to an enveloping unit, which performs the enveloping of the sheets on which the pages are printed, said information indicating to the enveloping unit the number of sheets which it must insert in a given envelope.

According to another characteristic which depends on the previous one, the information is communicated to the enveloping unit as each envelope is made up.

BRIEF DESCRIPTION OF THE DRAWINGS

Further characteristics and advantages will emerge during the following description, given solely by way of non-limiting example and made with reference to the accompanying figures, in which:

FIGS. 4 to 8 are screen copies showing what the user sees displayed on his screen when he implements the method according to the invention for printing and preparing mail where the number of pages may vary from one envelope to another.

DETAILED DESCRIPTION

Figure 1:
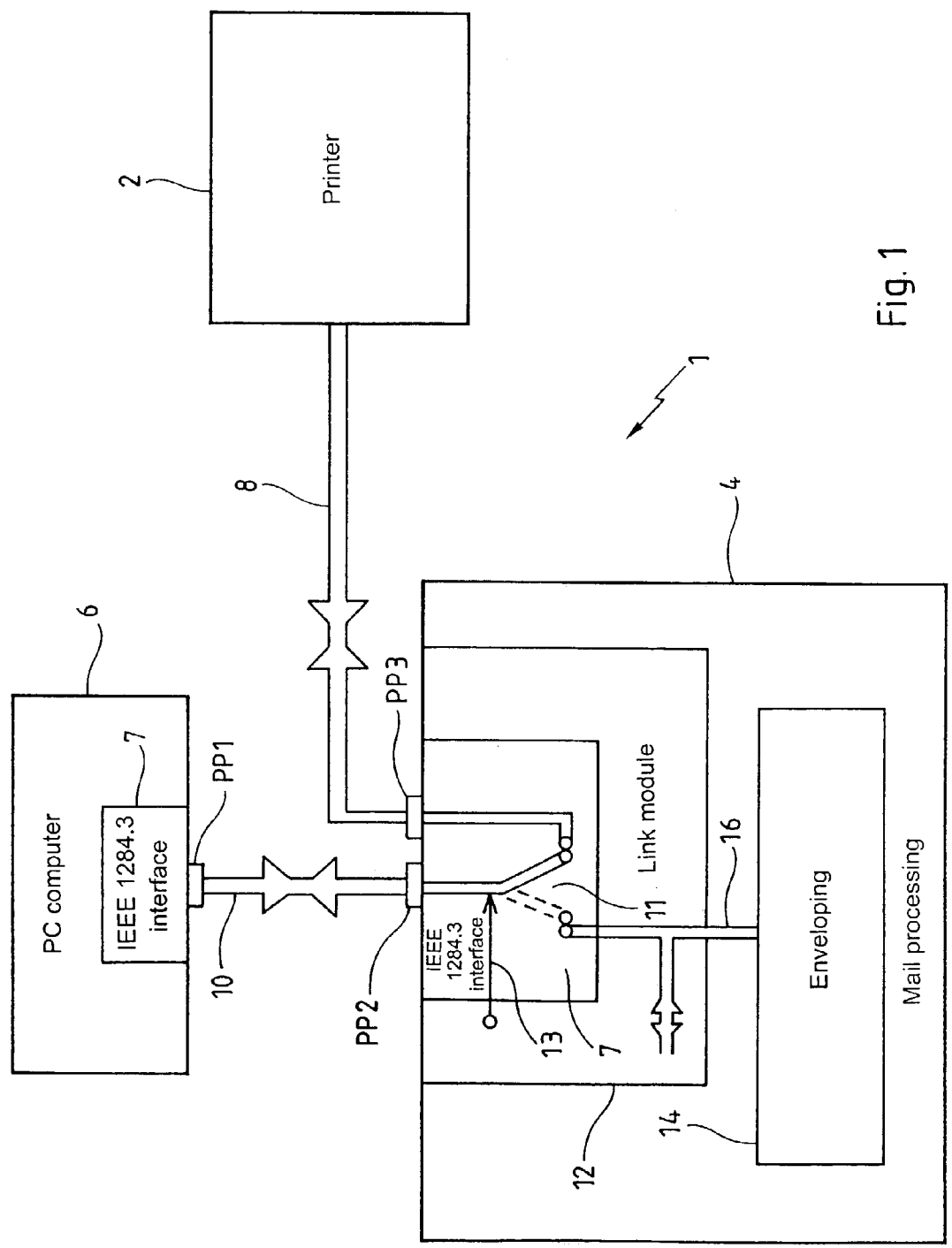
FIG. 1 is a schematic view of the general architecture of a mail printing and preparation device according to the invention.

FIG. 1 shows, in the form of functional units, the main elements of a centrally controlled printing and mail preparation device 1 in accordance with the invention. There are two peripherals here, namely a printer 2 and a mail preparation apparatus 4, connected to a PC (personal computer) type computer 6. The latter forms the source of printing and configuration data respectively for the printer 2 and the mail preparation apparatus 4.

The printing and configuration data are transmitted according to the IEEE 1284.3 protocol from the parallel port PP1 of the computer 6, standardly used for connecting a printer. This specification offers the possibility of connecting up several peripherals from a common parallel port of a PC by chaining these peripherals together. This method of connection is better known by the English term daisy chaining. Generally speaking, peripherals thus daisy-chained together form the links of a chain in the connection with the computer. The data passing along the link include an indication of the peripheral for which they are intended. A peripheral upstream of the destination peripheral of these data then only acts as a transmitting relay to its peripheral downstream in the chain.

The IEEE 1284.3 specification also lays down a two-way data transfer protocol, which enables a peripheral to transmit data to another peripheral or to the computer.

The embodiment that will be described exploits these two characteristics of the IEEE 1284.3 specification, namely the daisy-chaining of several peripherals and two-way communication.

The procedures for setting up a connection between a PC and peripherals according to the IEEE 1284.3 specification are known in the field of data processing and, in order to be concise, will not therefore be described here in detail. It should just be noted that there are several sources of detailed information on the IEEE 1284.3 specification that are useful in this connection, for example the Internet site of the IEEE Institute:

http://www.IEEE.com whose contents are regarded as forming part of the present application by reference.

An interface 7 under the IEEE 1284.3 specification is integrated into the computer 6 and the mail preparation apparatus 4, this being used as a relay peripheral for the printer 2. For this purpose, the IEEE 1284.3 interface of the mail preparation apparatus 4 includes a first parallel port PP2 that connects the parallel port PP1 of the computer via a common communication channel 10, and a second parallel port PP3 to which the printer 2 is connected via a two-way link 8. It will be understood that all the data between the computer 6 and the printer or between the computer and the mail preparation apparatus 4 passes along this common link 10, which will thus be designated as the "common communication channel" in what follows.

In compliance with the recommendations of the standard IEEE 1284.3, the printer 2 is located at the end of the line and does not therefore act as a relay; accordingly, it does not need to be equipped with an IEEE 1284.3 interface. However, such an interface may be provided for the printer according to the applications, for example if it is not located at the end of the line.

The mail preparation apparatus 4 breaks down into two functional units: a link module 12 incorporating the IEEE 1284.3 interface and an enveloping unit 14. The latter fulfills the function of folding sheets and insertion into an envelope according to the commands retransmitted by the link module 12 via an internal two-way bus 16.

As will appear further on, the link module 12 fulfills two functions:

switching data received via the common communication channel 10 either to the printer 2, or to the enveloping unit 14, and scanning the state of each of the peripherals 2, 4 and the internal management of the whole of the IEEE 1284.3 link, with the sending, where necessary, of interrupt and peripheral status signals.

The switching function is shown in FIG. 1 by a switch 11 for selectively connecting the port PP1 of the computer 6 either to the specific components of the mail preparation apparatus via the port PP2 and the internal bus 16, or to the printer 2. In the latter case, the switch 11 directly connects the port PP2 to the port PP3, the internal bus 16 then being disconnected. The switch 11 is controlled via a line 13 from the link module 12.

The whole device 1 will now be described in more detail with reference to FIG. 2. The computer 6 has a standard architecture that includes all the basic functionalities: motherboard, storage components, interface cards (sound, video, etc.), etc. in a designated unit 19.

In the example, the computer 6 uses a word processing program (e.g. Word) in a Windows environment (95, 98, NT or other), but other software platforms can be used. (Word and Windows are registered trademarks).

Under the Windows protocol, the computer 6 includes a standard print chain consisting of a graphics display interface (GDI) 18, a printer driver 20 and a print file generator 22.

The GDI interface 18 is a Windows layer providing a fairly simple printing protocol, especially enabling collaboration between application developers and hardware driver developers. This layer is therefore used to harmonize interfaces for data exchanges under Windows. Applications call up this GDI layer and the latter calls up the driver for everything that is hardware-dependent.

Subsequently the print file generator 22 creates print language files (e.g. in PCL). These files are intercepted (collected) by the data transfer engine 34 and are recorded, under the latter's command, on a computer storage medium, for example on a hard disk. These files can then be read from this medium at any time by the data transfer engine.

With regard to the specific control of the assembly consisting of the application 24, GDI 18, print driver 20 and file generator 22, the interception of print files by the data transfer engine is performed in a manner which is transparent to the user. In other words, the aforementioned assembly can be configured and controlled as if the print files normally went from the file generator 22 to the printer 2. In the example, the interception of print files by the data transfer engine is represented symbolically by a link 35. It will be understood that various file interception techniques are possible according to the envisaged architectures.

The computer 6 uses an assembly 26 comprising a keyboard 28 that integrates a pointer on the screen 28a (a user interface element), and a monitor screen 30 via which configuration data can be entered and monitored for the mail preparation apparatus 4. It will be understood, however, that these data may be introduced by any other means: medium reader, server link, etc.

It should also be noted that the user interface element can be any element enabling the user to interact with the computer: mouse, keyboard, voice recognition system etc.

A mail preparation apparatus configuration tool 32 is also provided, referred to hereafter as the configuration tool 32. The configuration tool prepares the configuration data intended for the mail preparation apparatus 4 in response to commands introduced by the user. For this purpose, the configuration tool 32 integrates a man-machine interface based on a software program for interactively controlling screen pages on the monitor. These pages contain alphabetically and/or graphically (icons) displayed menus enabling the user to select choices (method of folding, cover or envelope used, selection and number of documents to be inserted per envelope, processing of homogeneous or heterogeneous envelopes etc.) via his/her keyboard 28 and screen pointer element 28a.

Homogeneous envelopes are spoken of when the number of sheets contained in each envelope is the same, whereas heterogeneous envelopes are involved when this number can vary from one envelope to another.

The configuration data prepared by the tool 32 in response to the commands thus introduced by the user may take the form of files according to a protocol recognized by the mail processing device 4.

Thus, there are two sources of data intended for the peripherals:

the printing data, in the form of print files created by the generator 22 and stored under control of the engine 34, possibly enhanced by the configuration tool 32 and which are thus formatted so that they can be used by the printer 2, and the configuration data originating from the configuration tool 32, which are formatted so that they can be used by the mail preparation apparatus 4.

The transmission of these data is handled by a data transfer engine 34. The function of this engine is to collect and structure the printing or configuration data so that they can be routed subsequently to the peripheral for which they are intended, and subsequently send them to the common communication channel 10 according to the procedures of the standard IEEE 1284.3.

Thus, when the device 1 is in simple print mode, i.e. without using the enveloping unit 14, or at least without altering its initial configuration, it operates like a computer connected to a printer in accordance with the IEEE 1284.3 specification. The configuration tool 32 is then inactive.

In this case, the data transfer engine 34 loads the print files into an internal buffer memory (not shown). It performs this operation either by reading the print files from their storage medium, or by receiving them directly from the print file generator 22. In this case, the transfer engine also includes the print queue function, also known as spooling.

Several possibilities may be envisaged for making sure that the printing data arrive expressly at the printer 2. For example, the printer can be daisy-chained so that it is at the end of the line (see FIG. 1), i.e. no other peripheral is connected to the computer via a printer connection. In this case, the printing data can be transmitted as they are, without having to specify a destination address. This is because, in accordance with the standard IEEE 1284.3, when no peripheral is specified in an address message preceding the data, they automatically reach the peripheral at the end of the line. In other words, the switch 11 in FIG. 1 is set by default to connect port PP2 to port PP3.

It should be noted in this case that the data transfer engine 34 implicitly controls the switching of printing data to the printer 2, this being selected as the default destination peripheral. In other words, the absence of an explicit command for switching to another peripheral should be interpreted as a command for switching to the printer 2.

Thus, under the control of the application 24 via the GDI interface 18, the PCL files for printing reach the printer 2 according to the protocol of the IEEE 1284.3 specification. It should be noted that the assembly 1 is then configured as for a normal communication between a PC and a peripheral in compliance with this standard, and that no controller is interposed between the buffer memory 22 and the printer for analyzing the printing data.

It should be noted that, in the case of the processing of heterogeneous envelopes according to the invention, as will be seen subsequently, the configuration data are transmitted to the mail preparation apparatus 4 in real time, that is to say as each envelope is made up (the enveloping operation).

The fact that additional data are not added in the stream of data intended to be printed makes it possible to dispense with specific downstream equipment (e.g. optical readers) which would act as intermediate elements for on the one hand reading the sheets, for example a bar code, and on the other hand transmitting to the mail preparation apparatus 4 the information on the presence of this sheet intended for a given envelope.

On the other hand, in the case of the processing of homogeneous envelopes, the configuration data are transmitted to the mail preparation apparatus 4 only once before the first envelope is stuffed.

The general case of a command for configuring the mail preparation apparatus 4 will now be considered. This command originates in a selection transmitted, for example, by means of the keyboard 28 and its element 28a for pointing on the screen 30 under the control of the specific man-machine interface of the configuration tool 32.

At the monitor 30, the command is input from the menu displayed on the screen and which has, possibly combined, the choices relating to the mail printing and preparation parameters.

Figure 3:
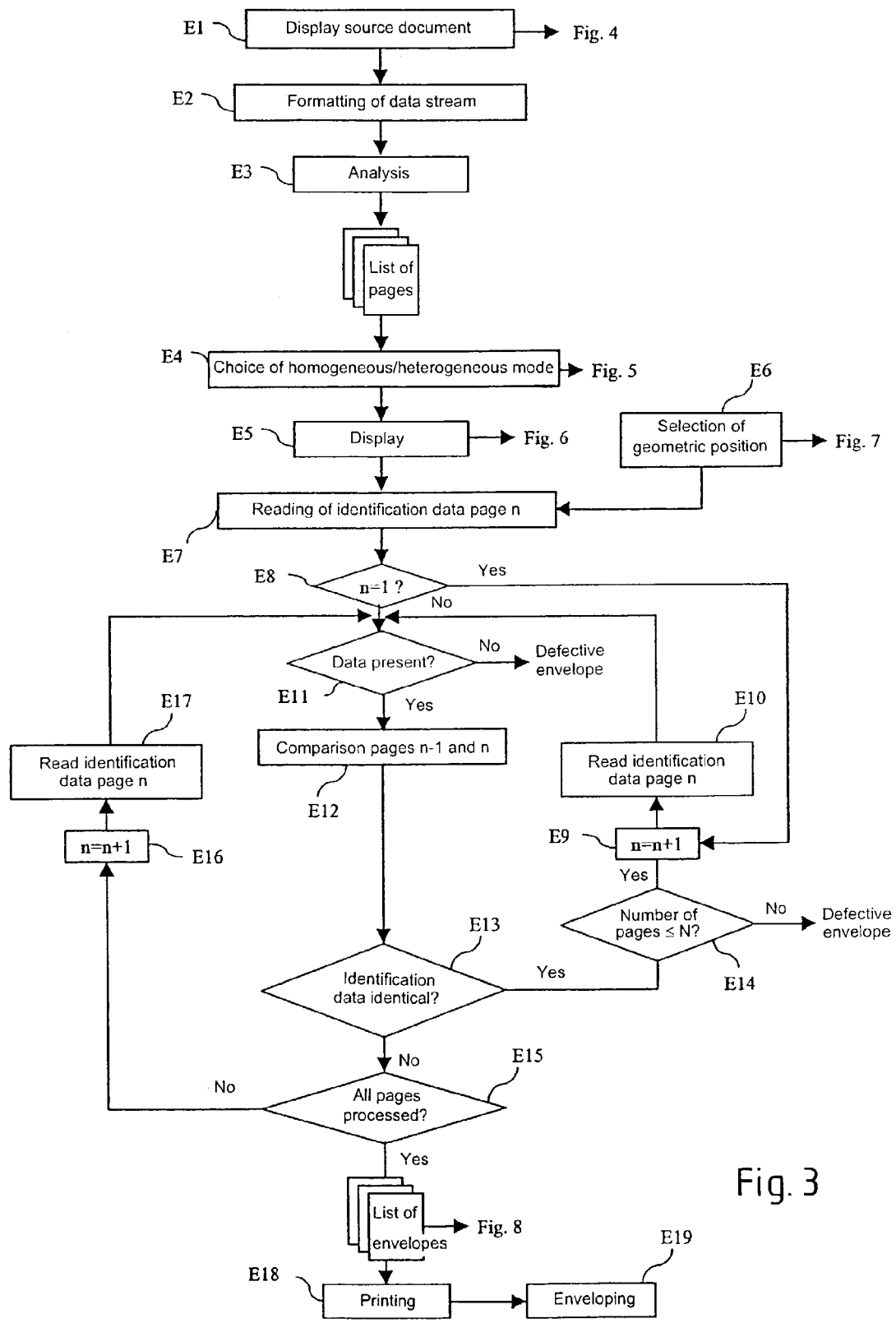
FIG. 3 depicts an algorithm for processing the stream of data which is distributed in several pages intended to be printed and enveloped.

During the description given with reference to FIG. 3 et seq., the way in which the data are processed when the user opts for the processing of heterogeneous envelopes will be returned to in more detail.

These configuration commands, chosen via the man-machine interface, are converted by the configuration tool 32 into commands that can be executed by the mail preparation apparatus 4.

The data transfer engine 34 is connected to the configuration tool 32 so as to:

receive these executable configuration commands; and associate a selection command with these commands that activates the switch 11 for the common communication channel 10 to be connected to the enveloping unit 14 via the internal bus 16 (FIG. 1). The selection command is thus an example of a switching command. Generally speaking, selection commands appear at the beginning of a frame containing the executable configuration commands. A selection command may include an address field for designating the peripheral concerned, in this instance the mail preparation apparatus 4, in the chain of peripherals. A selection command acts chiefly to operate the switch 11 within the IEEE 1284.3 interface of the link module 12, so that it connects up the port PP2, and therefore the common communication channel 10, onto the internal bus 16 which connects the enveloping unit 14. Of course, if other peripherals should be located upstream of the mail preparation apparatus, they would be deselected by the selection command in accordance with the established protocol. In this case, switches within their IEEE 1284.3 interface(s), similar to the aforementioned switch 11, would be operated to connect their parallel ports upstream and downstream.

Once the command has been generated, it may either be transmitted directly, or stored on the storage medium such as the hard disk, or else stored in a buffer memory of the data transfer engine 34.

When it is necessary to configure the mail preparation apparatus 4, the data transfer engine 34 suspends the print data stream being transmitted. The data transfer engine 34 can create the interrupt intelligently so that the printer's operation undergoes the minimum of disruption.

The executable configuration command frame(s) with their selection command are then transmitted on the common communication channel 10. The link module 12 detects the selection command and in response triggers the switch 11, so that the common communication channel 10 is connected to the internal bus 16. The executable configuration commands are thus received by the enveloping unit 14, where they are executed in accordance with a preset protocol, for example for selecting a method of folding, the type of envelopes to be processed, namely homogeneous envelopes or heterogeneous envelopes, the number of sheets to be inserted per envelope, the choice of envelope, etc.

When the transmission of executable configuration commands is finished, the data transfer engine 34 orders the switch 11 to be switched to its normal state, so that the common communication channel 10 is again connected to the printer 2.

In parallel, the data transfer engine 34 resumes the transmission of the previously interrupted print data stream.

In this way, the executable configuration commands are interlaced with the printing data, but without it being necessary to analyze the nature of the data used by the peripherals. This arises from the fact that an indication of the destination of the data has been given upstream, before their transmission.

Several approaches can be envisaged for signaling the end of the executable configuration commands and therefore the start or resumption of the print data stream on the common communication channel 10. For example, it can be arranged that:

the aforementioned selection command further includes a field indicating the number of bits or bytes contained in the set of executable configuration commands that follow. The link module 12 then counts the bits or bytes that follow the selection command and orders the switch 11 to re-establish the connection (on line 8) between the printer 2 and the data stream on the common communication channel 10 as soon as the corresponding number of bits or bytes has been transmitted to the enveloping unit 14; or the executable configuration commands are structured to include a predetermined set number of bits or bytes known to the link module 12. Thus, the latter controls the switch 11 as for the previous case, but referring to this number (stored internally) rather than to a number extracted from a specific field; or the configuration tool 32 further introduces data indicating the end of the executable configuration commands. This end of executable configuration commands indication may take the form of a frame following the last configuration data item. When this end of configuration frame is detected, the link module 12 orders the switch 11 to re-establish the connection (on the line 8) between the printer 2 and the data stream on the common communication channel 10.

FIG. 3 illustrates an algorithm comprising various instructions or portions of software code corresponding to steps of the method according to the invention.

The computer program which is based on this algorithm is stored in a memory medium of the computer, for example on a hard disk or in a non-volatile memory of the ROM type.

This algorithm makes it possible to process the stream of initial data constituting a document referred to as a source document such as, for example, a customer file corresponding, in the example embodiment which has just been described, to five different customers. In the example dealt with, the components of the customer file are invoices.

As depicted in FIG. 3, the algorithm begins with a step E1 during which the aforementioned source document is displayed, for example, on the screen 30 of the computer.

It should be noted that the stream of initial data intended to be printed is distributed over several pages, and FIG. 4 is a screen copy showing the display of a page of the source document on which certain data in the initial stream are presented.

The source document is edited, in the example in question, to the Word (registered trademark) format.

Figure 2:
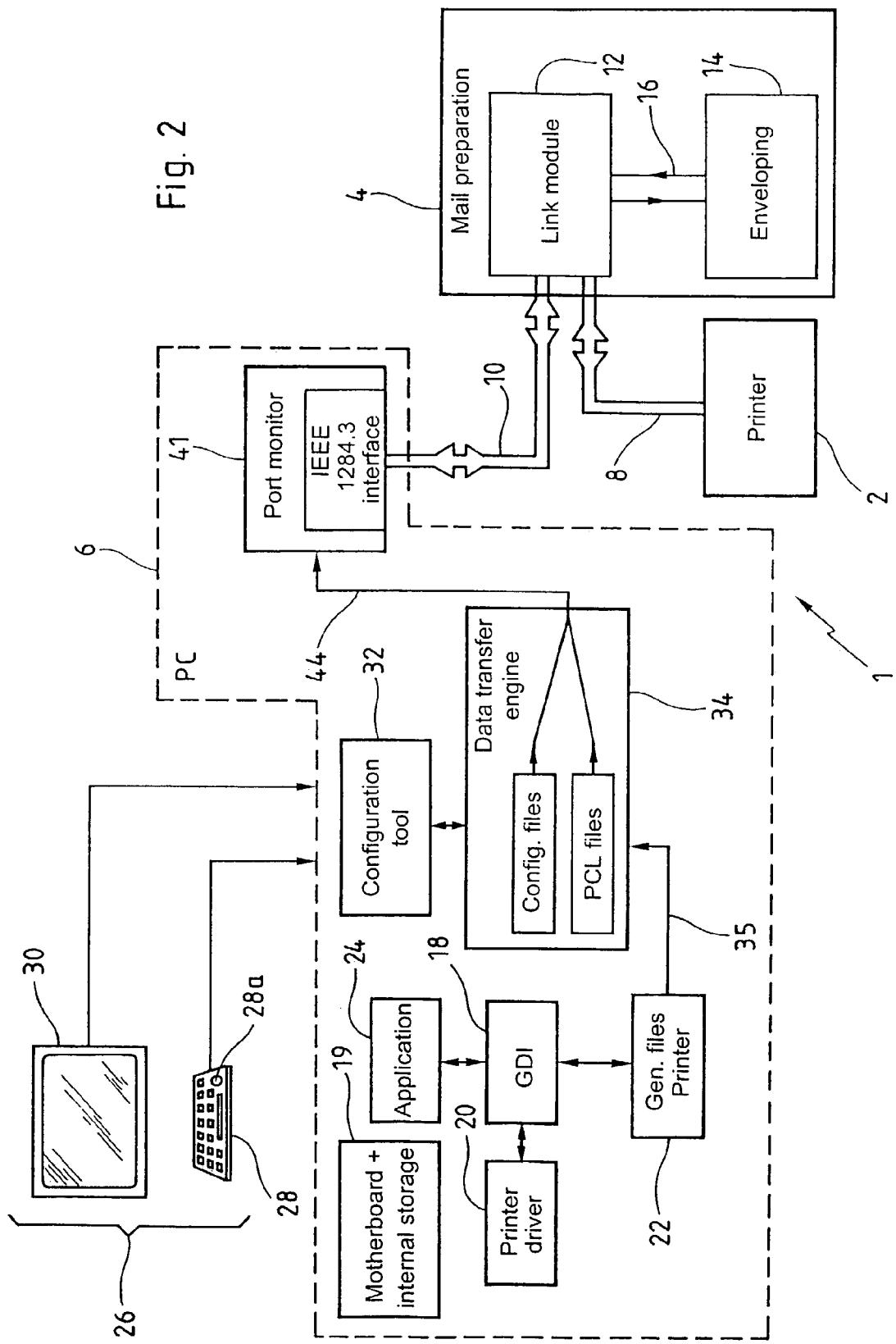
FIG. 2 is a more detailed schematic view of the device depicted in FIG. 1.

The following step E2 makes provision for formatting the stream of data distributed in several pages by means of the print driver 20 of FIG. 2.

Thus the print driver 20 expresses the data stream in a language which can be understood by the printer, such as for example the PCL language.

During the following step E3, provision is made for analyzing the data stream thus formatted.

During this analysis, each page of the source document is broken down into text areas.

The result of this analysis step supplies a list of the pages of the document which are each broken down into geometrically localized text areas.

Figure 5:
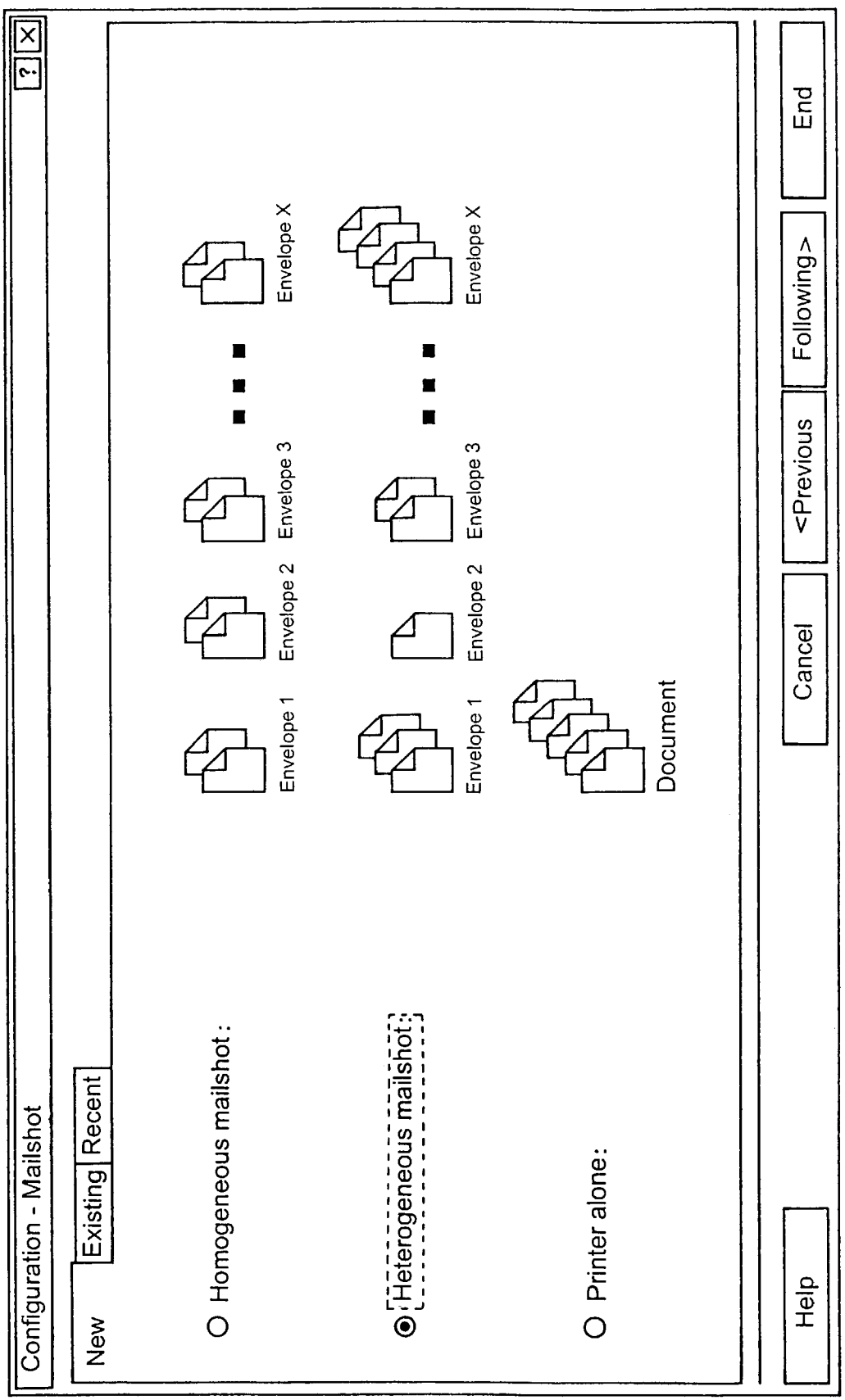

The algorithm then comprises a step E4, during which provision is made for choosing the method of processing the envelopes, as testified to by the screen copy shown in FIG. 5.

This is because it is possible for the user to opt for the processing of homogeneous envelopes (the same number of sheets in each envelope), to opt for the processing of heterogeneous envelopes (the number of sheets can vary from one envelope to another) or to opt only for the printing of the various pages resulting from step E3.

In the example in question, the case is adopted where the user chooses the heterogeneous envelope processing mode, as depicted in FIG. 5 by the selection of the "heterogeneous mailshot" mode.

During the following step E5, provision is made for the possibility of displaying the data stream page by page on the screen, each of the pages being broken down into text areas.

Figure 6:
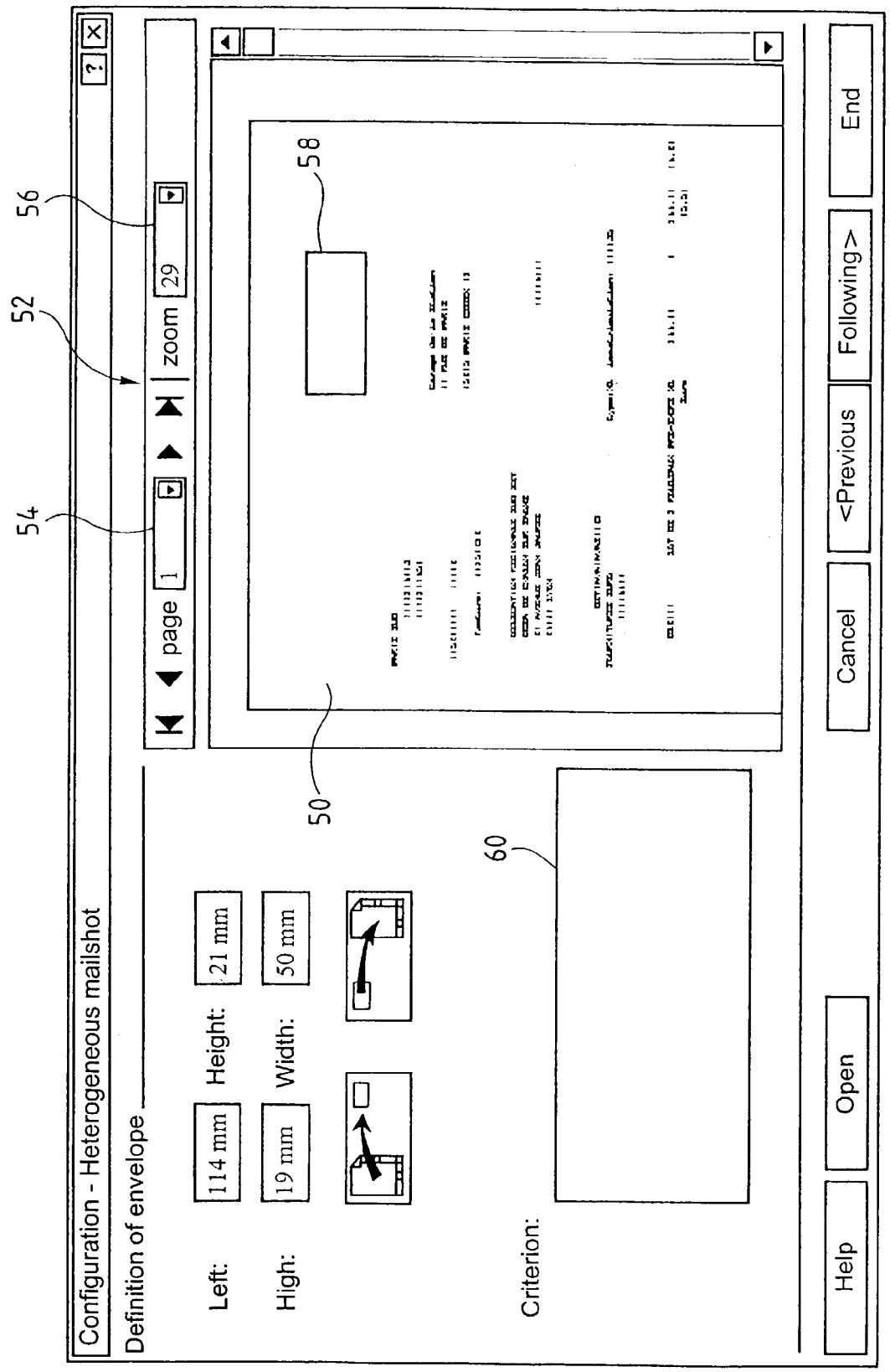

FIG. 6 is a screen copy illustrating the display of the data thus processed for a page.

The page is displayed in a window 50, at the top of which there is a selection bar 52 comprising, on the left, a part 54 for running through the various pages of the document by indicating the number of the corresponding page, or using the arrows shown which make it possible to run through the document page by page, in one direction or the other, and also to go directly to the start or end of the document.

The bar 52 also comprises, on the right, a part 56 which makes it possible to enlarge or reduce the page displayed on the screen in the window 50.

The algorithm in FIG. 3 comprises a step E6 of selection, by the user, of a geometric position or area on the page of the document displayed on the screen.

This geometric position or area is, for example, defined by the position of a frame, such as a rectangle 58 (FIG. 6) with respect to the point of origin of the page situated at the top left thereof, and by the length and width of this rectangle.

The position of this rectangle and its length and width are expressed, for example, in units of length.

During step E6, the user selects a geometric position within the meaning of the present invention by moving the rectangle 58 to a given point on the sheet where data from the data stream are situated.

This movement takes place by means of a user interface element such as, for example, the computer mouse or the keyboard.

Figure 7:
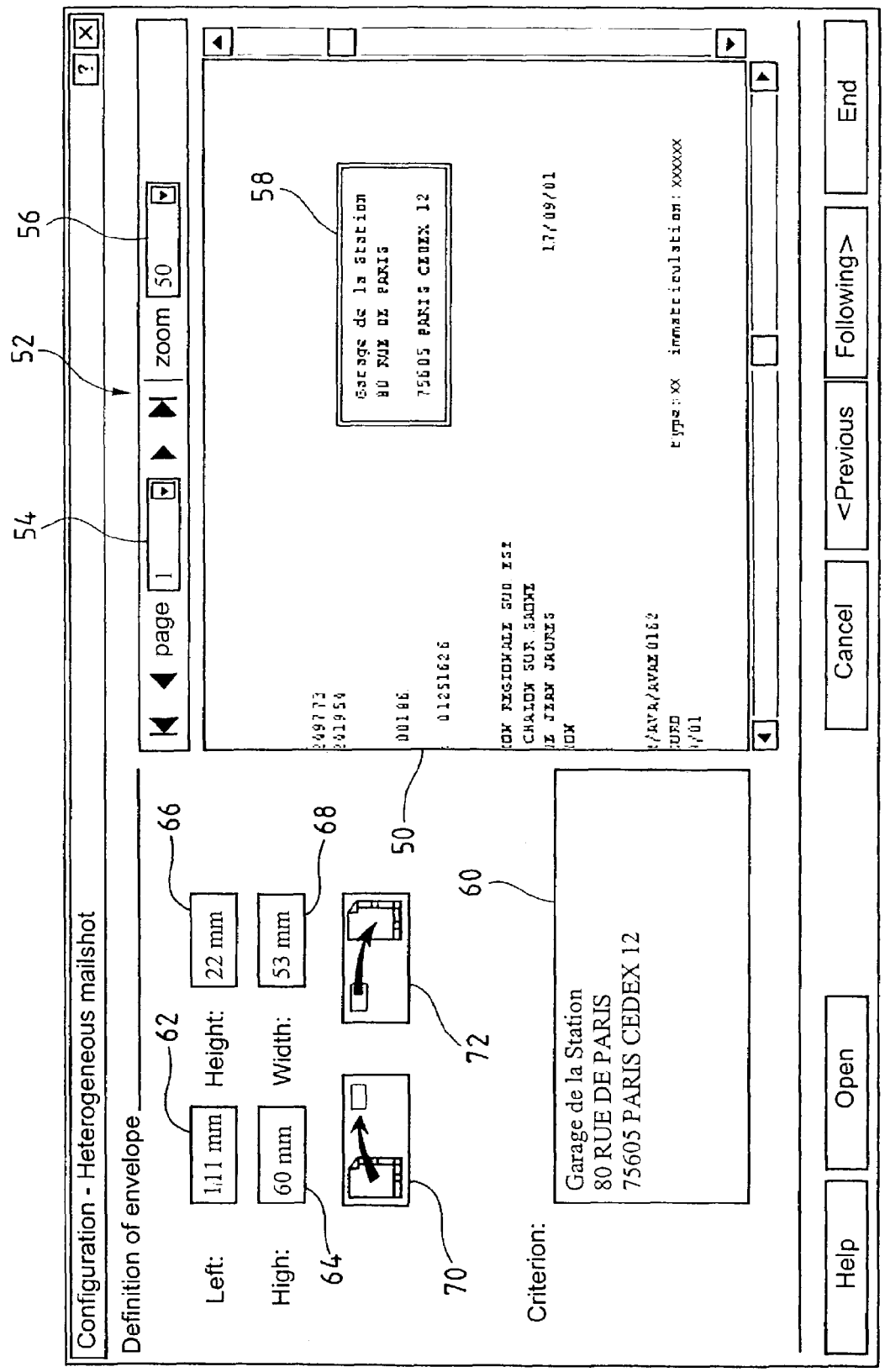

FIG. 7, which is also a screen copy, illustrates the positioning of the rectangle 58 in an area of the page containing data, hereinafter referred to as identification data.

By means of this operation of defining a geometric position on a given page, the user has made a selection of a data identification criterion. This criterion will serve to identify the various pages of the document which are intended to be contained in the same envelope.

As depicted in FIG. 7, the user has here selected the geometric position allocated to the identification data representing the address of the addressee of the invoice.

Thus all the pages containing the same identification data at this same geometric position will be inserted in the same envelope.

It should be noted that, once the geometric position has been selected by the user, the latter then merely needs to make a new selection of a criterion in order to identify the various pages intended to be contained in the following envelope when the latter is processed.

This is because the method according to the invention makes provision for seeking, on each of the pages of the document, the identification data allocated to the same geometric position initially selected.

It will thus be understood that the user does not need to display more than one page at step E5, since a single page normally suffices for selecting the identification criterion.

As is clear in FIG. 7, the user has enlarged the page displayed in FIG. 7 by means of the part 56 (zoom) of the selection bar 52.

It should be noted that, when the user has selected a geometric position by moving the rectangle 58 onto an area of the page where data are present, the latter are then displayed in a window 60 placed to the left of the window 50 and are therefore considered, as from this moment, as being the identification data making it possible to separate the pages intended for the envelope currently being processed.

According to a variant embodiment, it should be noted that the user can select another identification criterion for one or other of the following envelopes.

It should also be noted that the screen copy depicted in FIG. 7 comprises, in its top left-hand part, four windows 62, 64, 66 and 68 indicating respectively the distance of the rectangle 58 from the left-hand edge of the displayed page of the document, this distance of this rectangle from the top of the page, and the height and width of this rectangle.

These data are then displayed when the rectangle 58 is positioned in a given geometric position.

Moreover the user can, instead of moving the rectangle 58, enter, by means of the keyboard, the dimensions which he requires in the aforementioned windows 62, 64, 66 and 68, which will have the effect of placing the rectangle 58 in the required position.

It is also possible, by knowing in advance the definition of the required geometric position, namely the dimensions present in the windows 62, 64, 66 and 68, instead of having to make the selection of the identification criterion on the screen, to do this automatically without displaying the page of the document currently being processed.

The presence of two icons 70 and 72 should also be noted, which are placed under the windows 62, 64, 66 and 68 and which make it possible respectively to move the window 50 through which there are displayed the data displayed on a page in the direction of the rectangle 50 and to move this rectangle towards the window.

It should be noted that the frame or rectangle 58 can take any other shape (square, round etc) without this affecting the principle of the invention.

As soon as the identification criterion or criteria have been selected at step E6 (FIG. 7), the data stream distributed over the various pages of the document is then analyzed according to this identification criterion or criteria in order to identify, for each envelope, the pages intended to be contained in the said envelope.

Thus, during step E7, the identification data for the page of order n are read.

The following step E8 comprises a test during which it is verified whether the page in question is the first page (n=1).

In the affirmative, the following step E9 is then passed to, during which the order of the page processed is incremented by one unit (n=n+1).

During the following step E10, the geometric position of the identification criterion selected is sought in the following page (of order n) and the identification data present at this position are read.

It should be noted that the analysis of the data stream according to the identification criterion selected by the user is made in a manner which is transparent to the latter.

During the following step E11, a test is carried out in order to determine whether data are present on the page of the processed document currently being analyzed for the geometric position selected.

If no data item is present then a signal "defective envelope" informs the user of a problem which has arisen during the processing according to the invention.

On the other hand, if data are present, these are then considered to be identification data.

Step E12 is then passed to, during which a comparison is made between the identification data allocated to the geometric position selected for the previous page (n−1) and the data present on the page currently being processed (order n) and allocated to the same geometric position.

During the following step E13, a test is performed in order to determine whether the identification data are identical between the aforementioned two consecutive pages.

It should be noted that the comparison made at step E12 and the test performed at step E13 make it possible to decide whether the page currently being analyzed is intended for the same envelope as the page previously analyzed.

In the affirmative, the following step E14 comprises a test during which it is determined whether the number of pages already identified as belonging to the same envelope is less than or equal to a threshold value N.

This value N is chosen according to the processing capacity of the enveloping unit 14 (FIG. 2) so that the number of pages or, more particularly, the number of sheets on which on the pages will be printed does not exceed the processing capacity of the enveloping unit.

It should be noted that it is considered, in this example, that only one page is printed on a sheet and therefore that the number of pages corresponds to the number of sheets.

However, it is of course possible for a sheet to be printed recto verso and therefore to correspond to two pages.

In this case, the threshold N is increased accordingly.

When the result of the test carried out at step E14 is negative, then a signal "defective envelope" informs the user of a problem which has arisen during the processing of the envelope concerned.

When the result of the test is positive, then step E14 is followed by the previously described step E9, during which the order n of the page currently being analyzed is incremented by one unit and the following page is therefore passed to (steps E10, E11, E12 and E13).

Returning to step E13, when the identification data are not identical between the two pages between which the comparison provided for at step E12 is made, then step E13 is followed by step E15, during which another test is performed in order to determine whether all the pages in the document have been processed.

In the negative, step E15 is followed by a step E16 during which the order of the page currently being analyzed is incremented by unity in order to process the following page, and step E17 is then passed to.

During this step the geometric position of the identification criterion is sought, just as in the previously described step E10, in the page currently being analyzed (order n).

The identification data present at this geometric position are then read.

It should be noted that, during the loop made by the execution of steps E16 and E17, the pages which have just been processed and which are intended for the same envelope are stored in memory.

Step E17 is followed by a previously described step E11, during which a test is performed in order to determine whether or not, at the geometric position found at step E17, data are present.

The previously described steps E12 and E13 will not be described again here, nor the loop corresponding to steps E14, E9 and E10, nor the one corresponding to steps E16 and E17, depending on whether the result of the test performed at step E13 is positive or negative.

Returning to step E15, when all the pages in the document have been processed, then provision is made for making a list of the envelopes which are displayed on the screen 30 of the computer, as shown in the screen copy illustrated in FIG. 8.

In this figure, the five envelopes numbered 1 to 5 in which, in the second column referenced 74, the various pages of the source document and their number per envelope (customer file) are distributed, are displayed in the first column referenced 73.

In this figure there also appear the identification criterion selected by the user and the address 76 of the customer for which the envelope is intended.

It should be noted that, in the example chosen, the address corresponds to the identification criterion but that this is in no way a necessity.

Moreover, in the lower part of the screen copy there are indicated two possibilities of display represented by areas of choice 80 and 82 corresponding respectively to the display of the list of all the envelopes or only the list of defective envelopes.

In the example in question, no envelope is defective.

Provided that the processing of the data stream according to the invention has been performed and has made it possible to form a file of heterogeneous envelopes, according to the identification criterion selected by the user, provision is then made at step E18 of the algorithm in FIG. 3 to initiate the printing of the various pages making up each envelope on sheets using the printing unit 2 of FIG. 2.

Thus the data to be printed come from the engine 34 and are transmitted to the printing unit 2 as described above, namely envelope by envelope.

In parallel to the commands transmitted to the printing unit 2, the configuration data are transmitted to the mail preparation apparatus 4 in order to inform the latter and, more particularly, the enveloping unit 14 of the number of sheets which the envelope currently being made up must include.

It should be noted that the data issuing from the engine 34 when they are transmitted to the printing unit envelope by envelope procure a certain degree of security in so far as the integrity of the content of each envelope is respected.

However, it is not essential to provide such a functioning and it is entirely conceivable to provide for the data issuing from the engine 34 and relating to an envelope to begin to be transmitted before the data issuing from this same engine and relating to the previous envelope have finished being transmitted.

The enveloping of the pages of the document printed on sheets is then carried out during step E9 of the algorithm in FIG. 3.

It should be noted that the algorithm in FIG. 3 is implemented by various elements of the device according to the invention which is depicted in FIG. 2.

More particularly:

step E1 is implemented by the GDI interface 18;

step E2 is partly implemented by the printer driver 20 and partly by the print file generator 22;

step E3 is implemented by the engine 34;

steps E4 to E7 are implemented by the configuration tool 32;

steps E8 to E15 are implemented by the engine 34;

step E18 is implemented by the printing unit 2;

step E19 is implemented by the mail preparation apparatus 4 and in particular by the enveloping unit 14.

The algorithm in FIG. 3 thus makes it possible to configure the enveloping unit 14 when heterogeneous envelopes are processed.

It should also be noted that the algorithm in FIG. 3 can comprise a step of verifying the compatibility of the identification criterion selected by the user with one or more characteristics of the enveloping unit 14. An example of a characteristic is for example the processing capacity of the enveloping unit.

This is because it can be conceived that the source document displayed at step E1 of the algorithm may consist solely of pages all comprising the same identification data, namely for example the address of the addressee.

In this case, the number of pages will very quickly exceed the threshold fixed by the number N representing the processing capacity of the enveloping unit and the user will then have to select another identification criterion.

It should be noted that the algorithm of FIG. 3 would enable the user to select another identification criterion if step E14 were followed by step E6 when the result of the test performed at step E14 is negative.

It should also be noted that the user can also have available a pre-established list of identification criteria which are immediately compatible with the characteristic or characteristics of the enveloping unit.

In this case, this facility avoids having to provide the aforementioned verification step during the execution of the algorithm in FIG. 3.

Returning to FIG. 2, the aforementioned lines 8, 16 and 10 which connect the peripherals to the computer in accordance with IEEE 1284.3 being bi-directional, the link module 12 also fulfills a scanning function in which it ensures that data return from one of the peripherals either to the other or to the computer 6. In the latter case, the data go back through the common communication channel 10 to the port monitor 14 and from there pass over an internal bus 44. This bus is connected in particular to the configuration tool 32 and to the printer driver 20.

The link unit 12 can also dialogue directly with the computer using the IEEE 1284.3 protocol. This dialogue is two-way and takes place via the common communication channel 10, the port monitor 41 and the internal bus 44. In its function as a scanner, the link module 12 continuously or periodically watches the operating state of the peripherals 2 and 14 by checking parameters such as: idle/active state, current tasks (letter or envelope printing, folding, etc), data flows arriving, identification of messages emitted by the peripheral (paper jam, no paper or printing product, corruption of data and other incidents), quantification of work carried out etc. These data acquired from the peripherals then go back to the computer 6, possibly after formatting, to enable the latter to react accordingly.

The link module 12 can also manage certain aspects of the functioning of the peripherals locally, for example in order to control interrupts in the event of overload or to have internal management routines executed.

The computer 6 can also instruct the link module 12 to execute or to have executed by the peripherals certain specific tasks in addition to the normal tasks of printing and processing mail, for example: reprogramming software or internal parameters, sending back specific data, triggering a reset, a maintenance cycle (head cleaning, calibration etc).

The embodiment which has just been described allows many variants and modifications whilst remaining within the scope of the claimed invention.

By way of example, the device can also comprise a franking unit which is also managed by the computer using a link according to the IEEE 1284.3 specification. In this case, means are provided for inserting parameterizing data for the franking unit (rates, printing etc) in the data stream on the common communication channel 10 and addressed to the latter, like the configuration tool 32.

The various elements making up the device 1 can be physically situated in a single cabinet, forming an integrated and self-contained system, or separate. In the latter case, the computer 10 can constitute a separate physical unit and the mail preparation apparatus can be either integrated in the printer or be in a separate cabinet. Such a configuration will be implemented in particular when the device is designed to function in a network. In this case, a printer and/or a mail preparation apparatus are shared between several computer stations.

Whatever the architectures envisaged, it is clear that the various functional blocks described with reference to the figures can be organized differently, particularly with regard to their location in the various units. For example, the link module 12 can be a hardware or software unit integrated in the computer 6, and connected to the switch 11 either by the common communication channel or by another link.

Moreover, it can be envisaged using a data link other than the one based on IEEE 1284.3, for example an address-data bus according to various specifications.

The invention claimed is:

1. Method of printing and preparing mail from a data stream distributed in several pages which are intended to be printed on sheets and enveloped, the number of sheets contained in an envelope being able to vary from one envelope to another, characterized in that the method comprises the following steps:
   selecting from amongst the data stream at least one identification criterion for the various pages intended to be contained in each envelope,
   analyzing the data stream according to said at least one identification criterion in order to identify, for each envelope, the pages concerned,
   printing the pages on sheets,
   enveloping the sheets on which the pages are printed according to the result of the identification, for each envelope, of the pages concerned.

2. Method according to claim 1, characterized in that the selection of at least one identification criterion is made by selecting, on a given page, at least one geometric position to which there are allocated data in the data stream which are called identification data.

3. Method according to claim 1, characterized in that it comprises a prior step of displaying one or more pages containing at least some of the data in the data stream.

4. Method according to claim 3, characterized in that the selection is made by means of a user interface element.

5. Method according to claim 2, characterized in that the step of analyzing the data stream comprises more particularly the following substeps:
   seeking in a page currently being analyzed the geometric position allocated to the identification data,
   reading the identification data present at this geometric position,
   comparing the identification data present at this geometric position with the identification data for the page previously analyzed, and
   according to the result of this comparison, deciding in order to determine whether the page currently being analyzed is intended for the same envelope as the page previously analyzed.

6. Method according to claim 5, characterized in that, after the seeking step, the method comprises a step of verifying the presence of data at the geometric position found for the page currently being analyzed.

7. Method according to claim 1, characterized in that it comprises a step of verifying the compatibility of the selected identification criterion with at least one characteristic of an enveloping unit which performs the enveloping of the sheets on which the pages are printed.

8. Method according to claim 7, characterized in that one of the characteristics of the enveloping unit is the processing capacity of said unit.

9. Method according to claim 1, characterized in that the selected identification criterion is compatible with at least one characteristic of an enveloping unit which performs the enveloping of the sheets on which pages are printed.

10. Method according to claim 1, characterized in that, for each envelope, the method comprises a step of communicating information to an enveloping unit which performs the enveloping of the sheets on which the pages are printed, said information indicating to the enveloping unit the number of sheets which it must insert in a given envelope.

11. Method according to claim 10, characterized in that the information is communicated as each envelope is made up.

12. Device for printing and preparing mail from a data stream distributed in several pages which are intended to be printed on sheets and enveloped, the number of sheets contained in an envelope being able to vary from one envelope to another, characterized in that the device comprises:
   a unit for selecting from amongst the data stream at least one identification criterion for the various pages intended to be contained in each envelope,
   a unit for analyzing the data stream according to said at least one identification criterion in order to identify, for each envelope, the pages concerned,
   a unit for printing the pages on sheets,
   a unit for enveloping the sheets on which the pages are printed according to the result of the identification, for each envelope, of the pages concerned.

13. Device according to claim 12, characterized in that the selection of at least one identification criterion is made by selecting, on a given page, at least one geometric position to which there are allocated data in the data stream which are called identification data.

14. Device according to claim 12, characterized in that it comprises a unit for displaying one or more pages containing at least some of the data in the data stream.

15. Device according to claim 14, characterized in that the selection is made by means of a user interface element.

16. Device according to claim 13, characterized in that the data stream analysis unit comprises more particularly:
   a unit for seeking in a page currently being analyzed the geometric position allocated to the identification data,
   a unit for reading the identification data present at this geometric position,
   a unit for comparing the identification data present at this geometric position with the identification data for the page previously analyzed, and
   a unit for deciding in order to determine according to the result of the comparison whether the page currently being analyzed is intended for the same envelope as the page previously analyzed.

17. Device according to claim 16, characterized in that the device comprises a unit for verifying the presence of data at the geometric position found for the page currently being analyzed.

18. Device according to claim 12, characterized in that it comprises a unit for verifying the compatibility of the selected identification criterion with at least one characteristic of the enveloping unit which performs the enveloping of the sheets on which the pages are printed.

19. Device according to claim 18, characterized in that one of the characteristics of the enveloping unit is the processing capacity of said unit.

20. Device according to claim 12, characterized in that the selected identification criterion is compatible with at least one characteristic of the enveloping unit which performs the enveloping of the sheets on which the pages are printed.

21. Device according to claim 12, characterized in that, for each envelope, the device comprises a unit for communicating information to the enveloping unit which performs the enveloping of the sheets on which the pages are printed, the said information indicating to the enveloping unit the number of sheets which it must insert in a given envelope.

22. Device according to claim 21, characterized in that the information is communicated as each envelope is made up.

* * * * *